(12) United States Patent
Matsumoto

(10) Patent No.: US 6,377,365 B1
(45) Date of Patent: Apr. 23, 2002

(54) IMAGE SENSOR AND DOCUMENT READING APPARATUS INCLUDING THE SAME

(75) Inventor: Toshio Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/124,246

(22) Filed: Jul. 29, 1998

(30) Foreign Application Priority Data

Nov. 18, 1997 (JP) .............................................. 9-315743

(51) Int. Cl.[7] .................................................. H04N 1/04
(52) U.S. Cl. ..................................... 358/488; 250/599.8
(58) Field of Search ................................ 358/488, 448, 358/474, 514, 482, 475, 484, 400, 256, 296; 250/559.8

(56) References Cited

U.S. PATENT DOCUMENTS

| | | | |
|---|---|---|---|
| 4,783,700 A | * 11/1988 | Nagane | .................... 358/213 |
| 5,182,445 A | * 1/1993 | Yamashita | ................ 250/208.1 |
| 5,268,765 A | 12/1993 | Yamashita | ............. 358/213.13 |
| 6,014,231 A | * 1/2000 | Sawaase | ..................... 358/482 |

OTHER PUBLICATIONS

T. Hamaguchi et al., "Contact–Type Color Image . . . Method", Development & Applications, SPIE vol. 3019, Feb. 10–11, 1997, pp. 146–153.

* cited by examiner

*Primary Examiner*—Jerome Grant, II
*Assistant Examiner*—Negussie Worku
(74) *Attorney, Agent, or Firm*—Rothwell, Figg, Ernst & Manbeck

(57) ABSTRACT

An image sensor housing is provided with a through-hole or plural through-holes in a surface of the housing providing access to the interior of the housing which encloses a light source for illuminating a document, a circuit board, a light sensor mounted on the circuit board, and a rod lens array. The through-holes are covered with a detachable tape. The tape can be removed and replaced to provide access to the through-hole(s) for removing foreign matter from the interior of the image sensor, eliminating the need to disassemble components and/or discard defective image sensors in which foreign matter is present.

11 Claims, 9 Drawing Sheets

IMAGE SENSOR AND DOCUMENT READING APPARATUS INCLUDING THE SAME

BACKGROUND OF THE INVENTION

1. Field of the Invention

The present invention relates generally to an image sensor used in facsimile apparatus, printing apparatus and the like, and document reading apparatus having such an image sensor, and in particular to an image sensor unit which is easily maintained and reusable.

2. Description of the Related Art

FIG. 4 and FIG. 15 show a conventional image sensor of the type described, for example, in the Proceedings of SPIE (Society of Photo-Optical Instrumentation Engineers), Solid State Sensor Arrays: Development and Applications, Vol. 3019 (February 1997). FIG. 15 is an isometric view and FIG. 4 is a sectional view.

With reference to FIG. 4, an image sensor unit 7 includes a circuit board 2, a linear array of light emitting diodes 3 mounted on the circuit board 2, a rod lens array 4 for forming a 1:1 size image, which is comprised of a plurality of rod lenses (not shown), a linear array of sensor ICs 5 arranged on the circuit board 2, and a glass plate 6 positioned on the surface of the image sensor 7 across which a document 1 to be scanned travels. With reference to FIG. 15, numeral 7a denotes an end surface of the image sensor unit 7 and numeral 8 denotes a pair of tapped holes in end surface 7a used for attaching the image sensor unit to a document reading apparatus, such as a facsimile machine or printer.

In operation, the array of light emitting diodes 3 is arranged on the circuit board 2 as a line light source. The light beam from the light emitting diode array 3 passes through the glass plate 6 and illuminates the document 1, with reflected light from the document 1 (having a pattern corresponding to the density information of an image on the document 1) being transmitted through the rod lenses of the rod lens array 4 and formed as an image onto the sensor IC array 5. The array 5 is formed of a plurality of sensor ICs each a few millimeters long and arranged linearly according to the line reading direction of the image sensor. The ICs accumulate electric charges according to the intensity of the reflected light beam from the document 1, which charges are converted to a voltage signal that is outputted via the circuit board 2.

The frame of the image sensor unit 7 supports the rod lens array 4, the glass plate 6, and the circuit board 2. The circuit board 2 and the glass plate 6 are firmly secured to the frame of the unit 7 by an adhesive or the like such that they are not easily separated from the frame of the unit 7. In this regard, it is desired to prevent foreign matter from infiltrating the image sensor after assembly and possibly interfering with the reflected light beam from document 1 by settling between the glass plate 6 and the rod lens array 4. Consequently, the interior and exterior of the sensor unit 7 are completely isolated from each other by installing the circuit board 2 and the glass plate 6 in a permanent manner.

However, the conventional image sensor unit described above suffers from the problem that if during the manufacturing process foreign matter gets into the area surrounded by the circuit board 2, the glass plate 6, and the frame of the unit 7, and such foreign matter is not discovered until inspection of the unit after assembly, the structure in which the circuit board 2 and the glass plate 6 are firmly secured to the frame of the unit 7 with an adhesive or the like makes it difficult to detach these components from the frame of the unit in order to discharge the foreign matter from the interior with a blast of air or the like. Therefore, it is difficult to disassemble the components for removal of foreign matter, which frequently results in inevitable discarding of such assembled sensor units. Such cases arise even where the foreign matter is not located between the glass plate 6 and the rod lens array 4, because of the opportunity for the foreign matter to travel to that location as a result of subsequent handling of the image sensor unit and/or the document reading apparatus in which it is installed. Thus, even in cases where a foreign substance has infiltrated the sensor unit but is not between the glass plate and the rod lens array, such image sensor units cannot reliably be used in document reading apparatus.

Further, the conventional image sensor unit is installed in the document reading apparatus using screws which are screwed into tapped holes 8. Since it is difficult to directly screw the image sensor unit to the appropriate part of the document apparatus from the standpoint of assembly, a method has been employed wherein a mounting fixture having a shape suited for fixing the image sensor unit to the apparatus is provided and screwed to the image sensor unit, and the image sensor unit is then secured to the apparatus via the mounting fixture. However, securing the image sensor unit to the apparatus via the mounting fixture results in poor image sensor positioning precision within the apparatus. Such poor positioning with respect to the apparatus poses the problem of scanned images being crooked and discontinuous because the document 1 cannot be fed straight with respect to the image sensor unit. There thus exists a need for improvement in the art to eliminate the shortcomings and problems discussed above.

SUMMARY OF THE INVENTION

The present invention has been made with a view toward solving the problems mentioned above, and it is thus an object of the invention to provide an image sensor in which it is possible to easily expel foreign substances from an area surrounded by the circuit board 2, the glass plate 6, and the frame of the unit 7, without removing the circuit board 2 or the glass plate 6, thereby obviating the need to discard assembled sensor units containing foreign substances because of difficulty in disassembling and reassembling the components to remove such substances.

It is another object of the invention to provide an image sensor which permits accurate positioning of the image sensor withing document reading apparatus and enables straight and continuous images of scanned documents to be produced.

According to a first aspect of the invention, an image sensor includes a light source for irradiating light onto a document, a photoreceptor for receiving the light reflected by the document, an enclosure which houses the light source and the photoreceptor and having a plurality of wall surfaces which surround the light source and the photoreceptor, at least one of the wall surfaces being provided with a through hole; and a closing member detachably attached to the wall surface provided with the through hole, the closing member closing the through hole when the closing member is attached to the wall surface provided with the through hole.

Further, the wall surface provided with the through hole having a contact portion and the remaining portion, the contact portion contacting with the closing member, the contact portion being recessed with respect to the remaining portion thereby forming a step between the contact portion and the remaining portion.

The thickness of the closing member is smaller than the height of the step.

A document reading apparatus in accordance with the invention has:

an image sensor having a light source which irradiates light onto a document, a photoreceptor for receiving the light reflected by the document, and an enclosure which houses the light source and the photoreceptor and having a plurality of wall surfaces which surround the light source and the photoreceptor, a through hole being provided in at least one of the wall surfaces;

a rest on which the image sensor is rested; and a fixing member for securing the image sensor on the rest, the fixing member being provided with a protuberance which fits in the through hole.

The document reading apparatus further has a closing member which comes in contact with the wall surface provided with the through hole to close the through hole, wherein fitting the protuberance in the through hole causes the protuberance to push the closing member against the wall surface provided with the through hole.

A document reading apparatus in accordance with the invention comprises:

an image sensor having a light source which irradiates light onto a document, a photoreceptor for receiving the light reflected by the document, and an enclosure which houses the light source and the photoreceptor and having a plurality of wall surfaces which surround the light source and the photoreceptor, a recessed portion being provided in at least one of the wall surfaces;

a rest on which the image sensor is rested; and a fixing member for securing the image sensor to the rest, the fixing member being provided with a protuberance which fits in the recessed portion.

BRIEF DESCRIPTION OF THE DRAWINGS

The present invention will become more fully understood from the following detailed description in conjunction with the accompanying drawings, wherein.

DETAILED DESCRIPTION OF THE PREFERRED EMBODIMENTS

Figure 1:
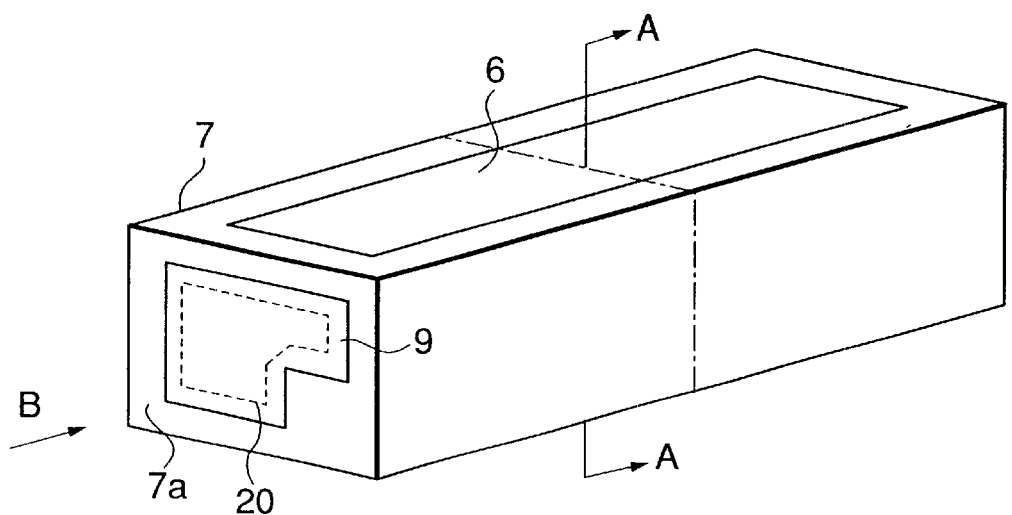
FIG. 1 is an isometric view of an image sensor according to a first embodiment of the invention.

FIG. 1 is an isometric view of an image sensor according to a first embodiment of the present invention. Image sensor unit 7 has an end surface 7a, and a document reading surface in which a glass plate 6 is disposed.

A through-hole 20 is provided in the end surface 7a as indicated by the dashed line. A peelable cover tape 9 is attached to the end surface 7a of the image sensor unit such that it covers the through-hole 20. While disclosed as a tape in this embodiment, it is to be noted that cover 9 can be made of any suitable material, the function of which is to securely cover the through-hole 20 while being easily removed and replaced.

Figure 2:
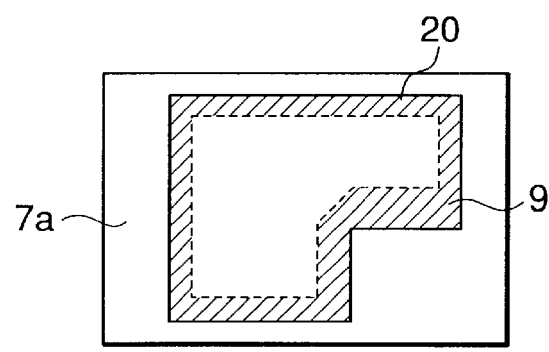
FIG. 2 is a side view of the image sensor of FIG. 1 observed from direction B.
Figure 3:
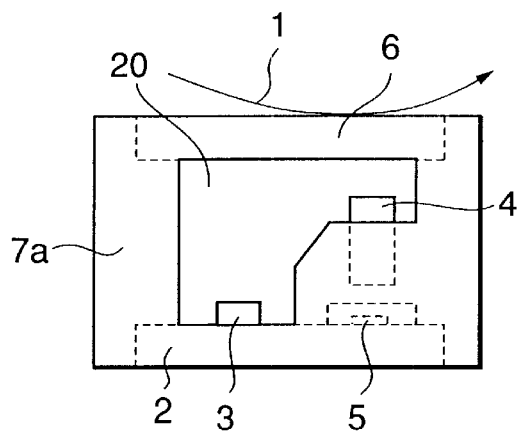
FIG. 3 is a partial phantom side view of the image sensor of FIG. 1 observed from direction B with cover tape 9 removed.
Figure 4:
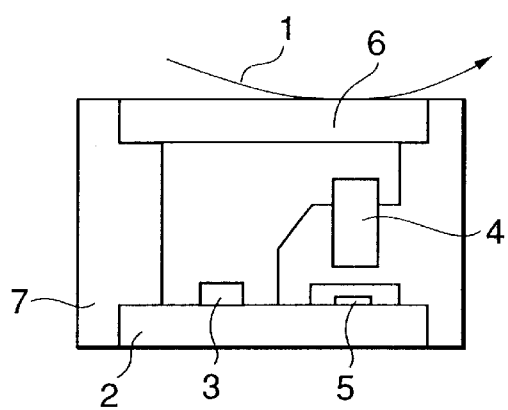
FIG. 4 is a sectional view of the image sensors of FIGS. 1 and 15 taken at the line A—A.

As shown in FIG. 2, the hatched section indicates the area on the cover tape where an adhesive has been applied, such that the tape 9 is removably attached to the end surface 7a over the through-hole 20. FIG. 3 illustrates the view (with a partial phantom view of the elements 2, 4 and 5) in which the tape 9 has been peeled off. As can be seen, the through-hole 20 is positioned so that the upper edge thereof is in near-alignment with the bottom surface of the glass plate 6, and the bottom edge thereof is in near-alignment with the top surface of the circuit board 2. The through-hole 20 is formed such that its edges have the same contours as the inner surface of the frame of the image sensor 7. The through-hole 20 as shown in FIG. 3 allows a foreign substance which has entered the interior of the body of image sensor 7 to be efficiently expelled or removed. FIG. 4 is a sectional view of the image sensor of FIG. 1, taken at the line A—A. Like elements of FIGS. 1 and 3 are given like reference numerals in FIG. 4.

The image sensor in this embodiment is shipped in such a manner that the through-hole 20 in the end surface 7a is covered with the cover tape 9 as shown in FIGS. 1 and 2. Thus, in this embodiment, even if inspection after assembly reveals the presence of a foreign substance within the body of the image sensor 7, the foreign substance can be removed using tweezers, chopsticks, wire, a stream of air, or the like through the through-hole without disassembling the image sensor, by simply removing the cover 9 and then replacing it over the through-hole once the foreign substance has been eradicated.

In particular, the distal ends of an implement such as tweezers or chopsticks are inserted into the through-hole to grasp the foreign substance and carry it out of the interior of the image sensor. Alternatively, a wire with its distal end formed into a hook may be inserted to hook the foreign substance and carry it out of the image sensor interior. Thus, even if a foreign substance infiltrates the image sensor during the manufacturing process, the image sensor can be quickly restored to a nondefective product instead of being disposed of. Furthermore, since the invention obviates the need for disassembly, image sensors are not damaged during the disassembly process.

Since the through-hole 20 is covered with the tape 9 at the time of shipment, no foreign substance can enter the image sensor after shipment. Furthermore, even if a foreign substance should be discovered by a customer or user, the cover 9 can be removed to permit quick removal of the foreign substance, thus restoring the image sensor to a nondefective condition.

In this embodiment, adhesive tape 9 is employed to cover the through-hole 20 in the end surface 7a; the adhesive may be applied only to the portion of the tape 9 which comes in contact with the end surface 7a, or it may be applied to the entire surface of the tape 9. Applying adhesive to the entire surface of the tape 9 makes it possible to cause a foreign substance inside the image sensor to be adhered to the adhesive of the tape 9 by tilting the image sensor and thereby obviating the need to use an implement such as tweezers in some cases. Thus, in this respect there is an advantage to applying adhesive to the whole surface of the tape 9.

As mentioned above, the cover tape 9 is one example of a closing member which is detachably attached to the end surface 7a of the image sensor for covering the through-hole 20. However, the closing member equivalently may be a plate, a sheet and the like, with equivalent results. Similarly, the light emitting diodes 3, sensor ICs 5, glass plate 6 and circuit board 2 are examples of such components as may be used in constituting the image sensor, and the present invention is not limited to the use of such components.

Figure 5:
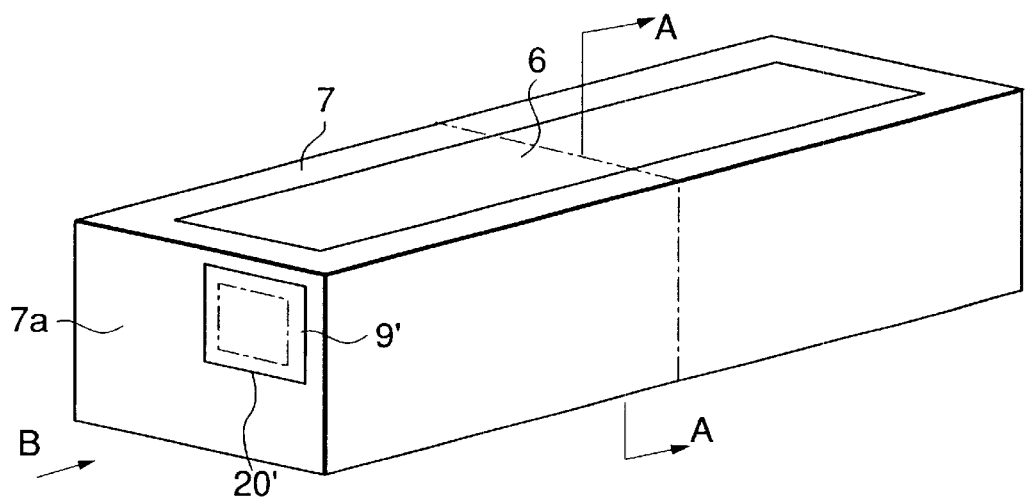
FIG. 5 is an isometric view of an image sensor according to a second embodiment of the invention.

FIG. 5 is an isometric view of an image sensor according to a second preferred embodiment. In this embodiment, through-hole 20' is provided in the end surface 7a of the body of the image sensor, and cover tape 9' is attached to the end surface 7a cover the through-hole 20'.

Figure 6:
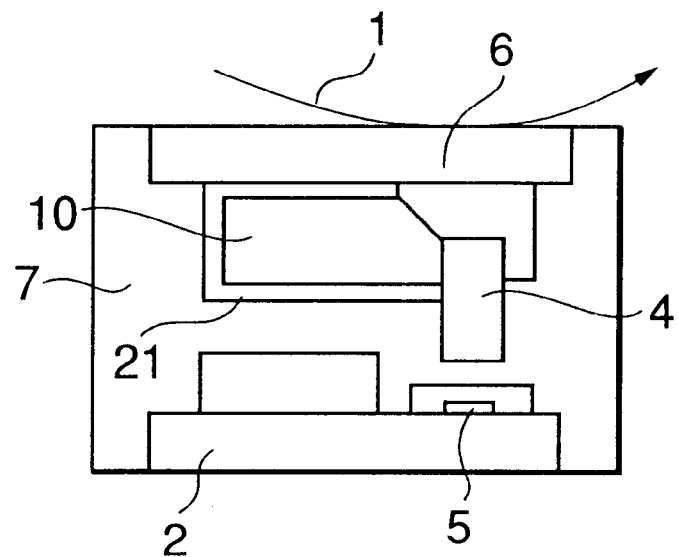
FIG. 6 is a sectional view of the image sensor of FIG. 5 taken at the line A—A.

FIG. 6 is a sectional view of the image sensor 7 of FIG. 5 taken at the line A—A. Like elements of FIGS. 1–5 are denoted by like reference numerals in FIG. 6. Reference numeral 10 indicates a light guide which guides a light beam from a source of illumination (not shown) to the document 1. A cover 21 is provided to prevent the light beam, which comes from a surface not opposed to the document, from leaking out in directions other than from a surface of the light guide 10 opposed to the document 1 for illuminating the document 1. Through-hole 20' is provided in the end surface 7a to provide access to the interior of the image sensor 7. As shown in FIG. 5, the through-hole 20' is covered with tape 9' after assembly as in the case of the first embodiment.

Figure 7:
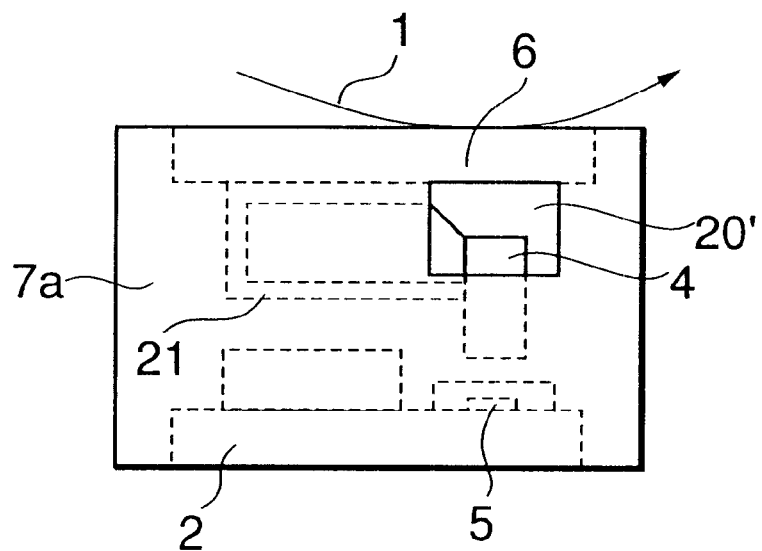
FIG. 7 is a partial phantom side view of the image sensor of FIG. 5 with cover tape 9' removed.

FIG. 7 is a side and partial phantom view showing the image sensor with the tape 9' removed. In this embodiment, the through-hole 20' is positioned at a location in the end surface 7a such that the top edge of the through-hole 20' is in near-alignment with the bottom surface of the glass plate 6, while the bottom edge of the through-hole 20' is in near alignment with the surface of the cover 21.

In this embodiment, since the through-hole 20' in the end surface 7a of the image sensor is provided to the interior of the image sensor, the same advantages as those of the first embodiment are accomplished.

Figure 8:
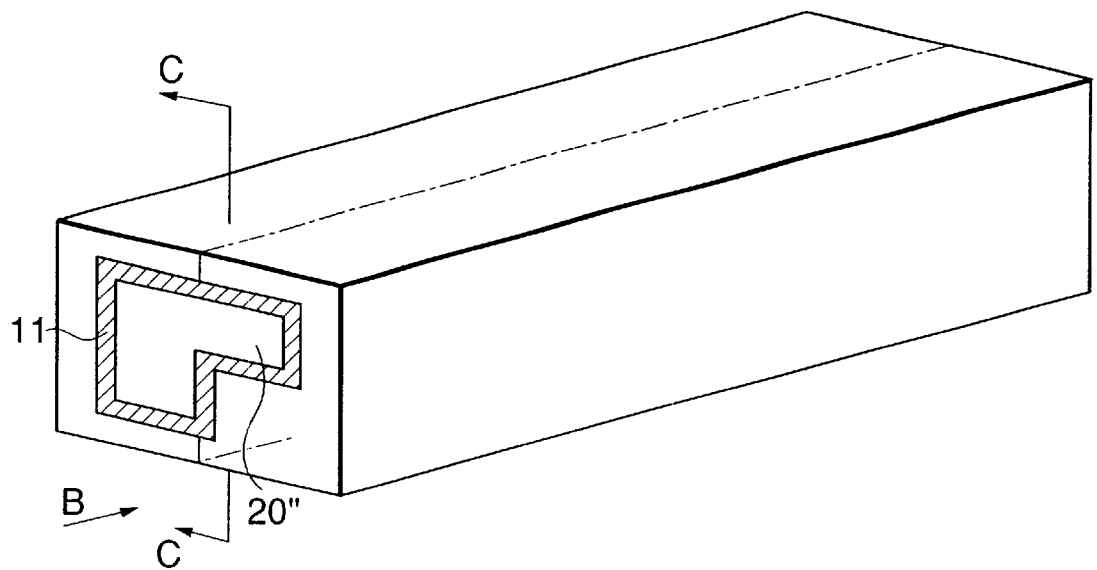
FIG. 8 is an isometric view of an image sensor according to a third embodiment of the invention.

FIG. 8 is an isometric view of an image sensor according to a third embodiment of the invention. In FIG. 8, the tape covering the through-hole 20" has been removed. The hatched area indicates a stepped portion 11 provided around the periphery of through-hole 20". The stepped portion 11 will be discussed below.

Figure 9:
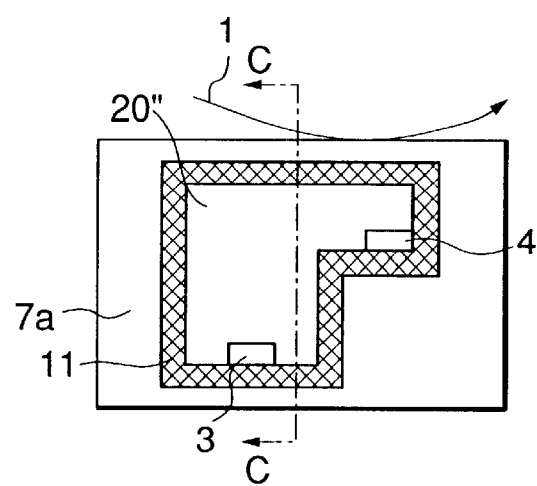
FIG. 9 is a side view of the image sensor of FIG. 8 observed from direction B.
Figure 10:
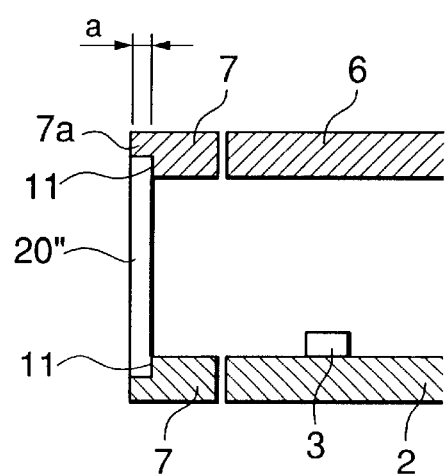
FIG. 10 is a sectional view of the image sensor of FIG. 8 taken at the line C—C.

FIG. 9 is a side view of the image sensor of FIG. 8 observed from direction B. As in the other figures, like elements in FIG. 9 are denoted by like reference numerals and their description will not be repeated. Stepped portion 11 provided around the periphery of the through-hole 20" of the frame end surface 7a has a step or recess, as shown in FIG. 10. The end surface 7a thus has a contact portion with which the cover tape makes contact, and a remaining portion which does not make contact with the cover tape. The step of the stepped portion is formed between the contact portion and the remaining portion, with the contact portion being recessed with respect to the remaining portion as shown in FIG. 10. FIG. 10 is a sectional view of the image sensor of FIGS. 8 and 9 taken at the line C—C in the vicinity of the end surface 7a of the image sensor 7.

As seen in FIG. 10, the stepped portion 11 is composed of a step which has a depth of dimension "a" in relation to the end surface 7a. In this embodiment also, the through-hole 20" is covered with a tape cover (not shown) as in the case of the first embodiment. The size of the tape is set so that it is larger than the through hole 20" and smaller than the periphery of the stepped portion 11, and the thickness of the tape is smaller than the depth "a" of the step. In this embodiment, a step which is deeper than the thickness of the cover tape is provided at the position in the end surface where the tape is attached to cover the through-hole, and therefore the tape 9 does not extend out beyond the end surface 7a, enabling the end surface 7a to provide a reference surface for installing the image sensor on an apparatus. Further, since the contacting surface of the tape is surrounded by the stepped portion 11, the chances of foreign matter entering the inside of the image sensor 7 at the edges of the tape are reduced. Moreover, the stepped portion 11 makes it possible to prevent the tape from being inadvertently peeled off by contact with other objects during handling of the image sensor.

Figure 11:
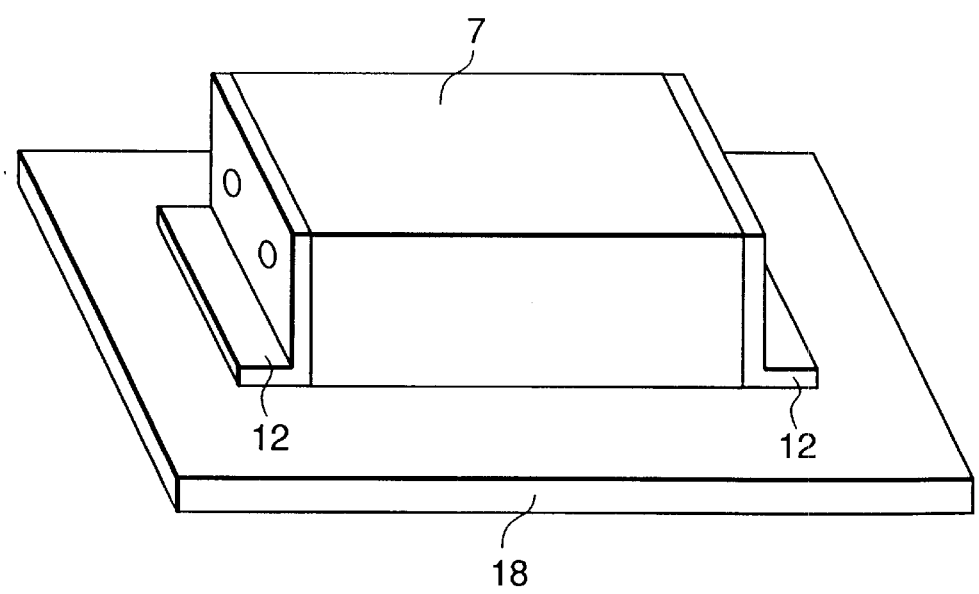
FIG. 11 is an isometric diagram illustrating the image sensor according to a fourth embodiment of the invention mounted on a document reading apparatus.

FIG. 11 is an isometric view showing an image sensor 7 according to a fourth embodiment of the present invention mounted on a document reading apparatus, emphasizing the manner in which the image sensor 7 is mounted on the document reading apparatus. Reference numeral 18 denotes a mounting base of the document reading apparatus on which the image sensor is mounted, and reference numeral 12 denotes a metal mounting fixture for installing the image sensor 7 on the mounting base 18.

Figure 12:
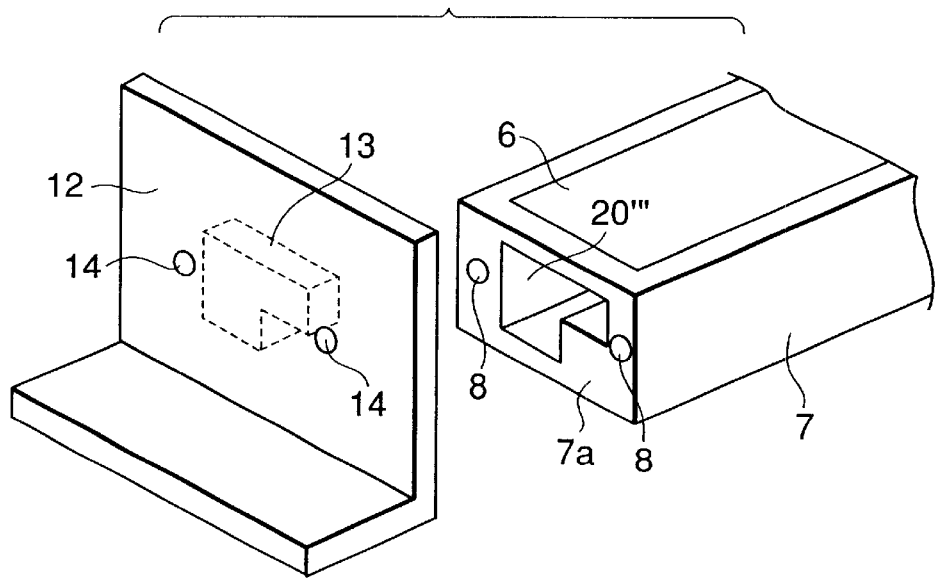
FIG. 12 is an isometric diagram illustrating the image sensor disassembled from a metal mounting fixture 12 according to the fourth embodiment of the invention.

FIG. 12 is a diagram illustrating the image sensor and the metal mounting fixture 12 in a disassembled state. The metal mounting fixture 12 is provided with a projection 13 which fits in through-hole 20''' of end surface 7a. The projection 13 has the same contour as that of the through-hole 20''' of the end surface 7a. Reference numeral 8 denotes a pair of tapped through-holes in the end surface 7a, and reference numeral 14 denotes a pair of tapped through-holes in the metal mounting fixture 12. The image sensor 7 and the metal mounting fixture 12 are fixed together by screws inserted through the tapped through-holes 8 and 14. The metal mounting fixture 12 is then mounted on the mounting base 18 by additional fixing member such as screws.

In this embodiment, through-hole 20''' is provided in the end surface 7a of the image sensor 7 to obtain the same advantages as those of the first embodiment. The projection 13 on the metal mounting fixture 12 facilitates positioning of the mounting fixture 12 when installing the mounting fixture 12 to the end surface 7a. Thus, the metal mounting fixture 12 can be screwed onto the image sensor with a high degree of accuracy, thereby enabling installation of the image sensor onto the mounting base 18 with a high degree of positioning accuracy.

While the mounting fixture 12 is disclosed as being made of metal, there should be no problem in using a mounting fixture made of another suitable material. Further, instead of using screws, pins or the like may be fitted in the tapped holes of the side surfaces, or other mounting methods may be used so long as the components are secured to each other by making use of the tapped holes. Additionally, the mounting base 18 is one example of a rest on which the image sensor is mounted in a document reading apparatus, and the mounting fixture 12 is one example of a fixing member for securing the image sensor to the rest. Other equivalent mechanisms for fixing the image sensor to a rest in a document reading apparatus are also suitable within the scope of the invention.

Figure 13:
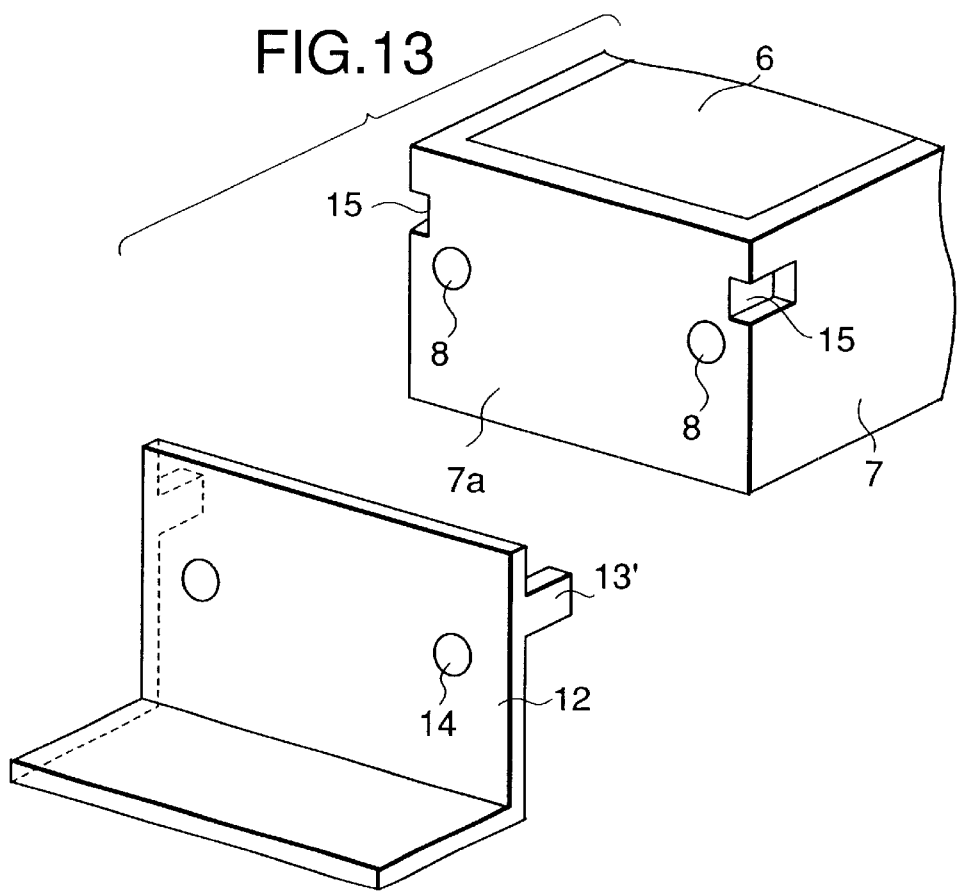
FIG. 13 is an isometric diagram illustrating the image sensor disassembled from a metal mounting fixture 12 according to a fifth embodiment of the invention.

FIG. 13 shows an image sensor and a mounting metal fixture 12 in a disassembled state according to a fifth embodiment. Reference numeral 15 denotes a pair of notches provided in an end surface 7a of the image sensor. When installing the mounting fixture 12 to the image sensor 7, projections 13' formed on the mounting fixture 12 are fitted into the notches 15. In addition, the image sensor 7 and the mounting fixture 12 are secured to each other by screws in tapped holes 14 in the mounting fixture 12 and tapped holes 8 in the end surface 7a. The mounting fixture 12 and the mounting base 18 are in turn secured to each other by appropriate fixing members such as screws.

In this embodiment, the notches 15 provided in the end surface 7a serve as reference openings for installing the mounting fixture 12 to the end surface 7a of the image sensor 7. The projections 13 provided on the mounting fixture 12 allow accurate positioning to be achieved by fitting the projections 13 into the notches 15. Hence, accurate positioning of the mounting fixture 12 relative to the mounting base 18 automatically ensures accurate positioning of the image sensor relative to the mounting base 18. The notches 15 in this embodiment are an example of a recessed portion provided in a wall surface of an enclosure, the contour and depth of which are designed and selected according to the required positioning accuracy, and other manufacturing considerations. Further, while the embodiment of FIG. 13 does not illustrate a through-hole in the end surface 7a, such a through-hole can be provided to allow access to the interior of the image sensor; such a through-hole can be covered by the surface of the mounting fixture 12 when fixed to the image sensor.

Figure 14:
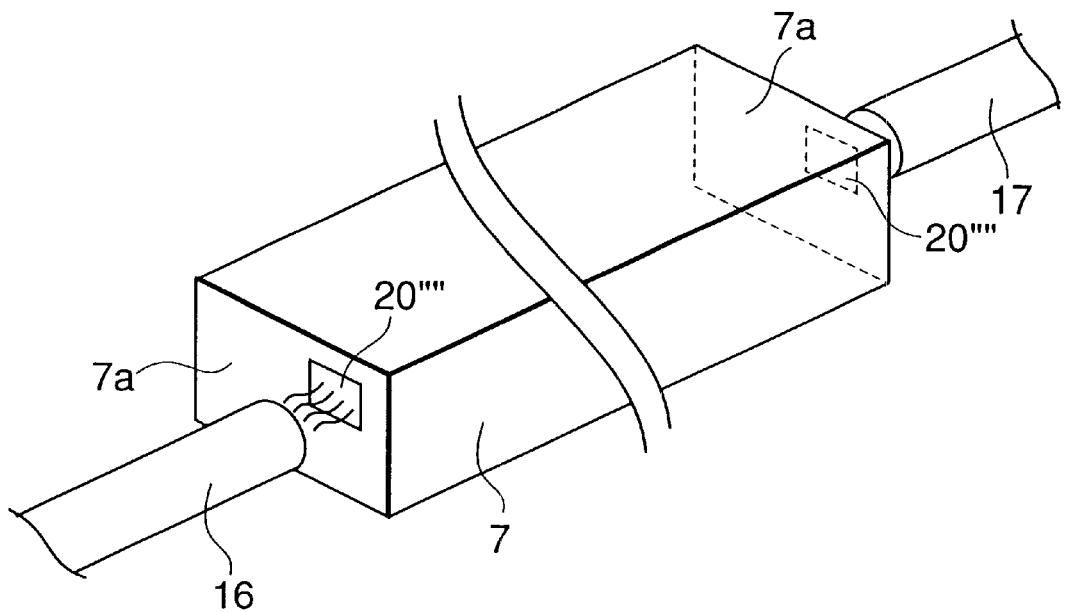
FIG. 14 is a partially sectioned, partial phantom diagram illustrative of the process for removing a foreign substance from an image sensor according to a sixth embodiment of the present invention.
Figure 15:
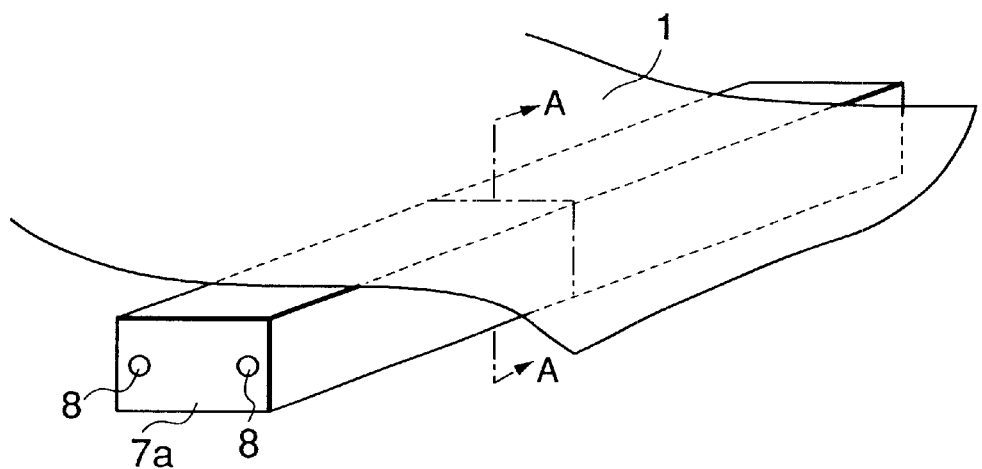
FIG. 15 is an isometric view of a conventional image sensor.

A sixth embodiment of the invention relates to a manufacturing method and a repairing method for an image sensor, and will be explained in conjunction with FIGS. 14 and FIG. 18. FIG. 14 illustrates the process for removing a foreign substance from the image sensor. In the diagram, like reference numerals denote like elements of the previous described figures. Through-holes 20'''' are provided in the end surfaces 7a on both sides of the body of image sensor 7. Reference numeral 16 denotes a first nozzle for blowing compressed air into the interior of the image sensor 7 through a first through-hole 20''''', and reference numeral 17 denotes a second nozzle for suctioning air from the interior of the image sensor 7.

Figure 18:
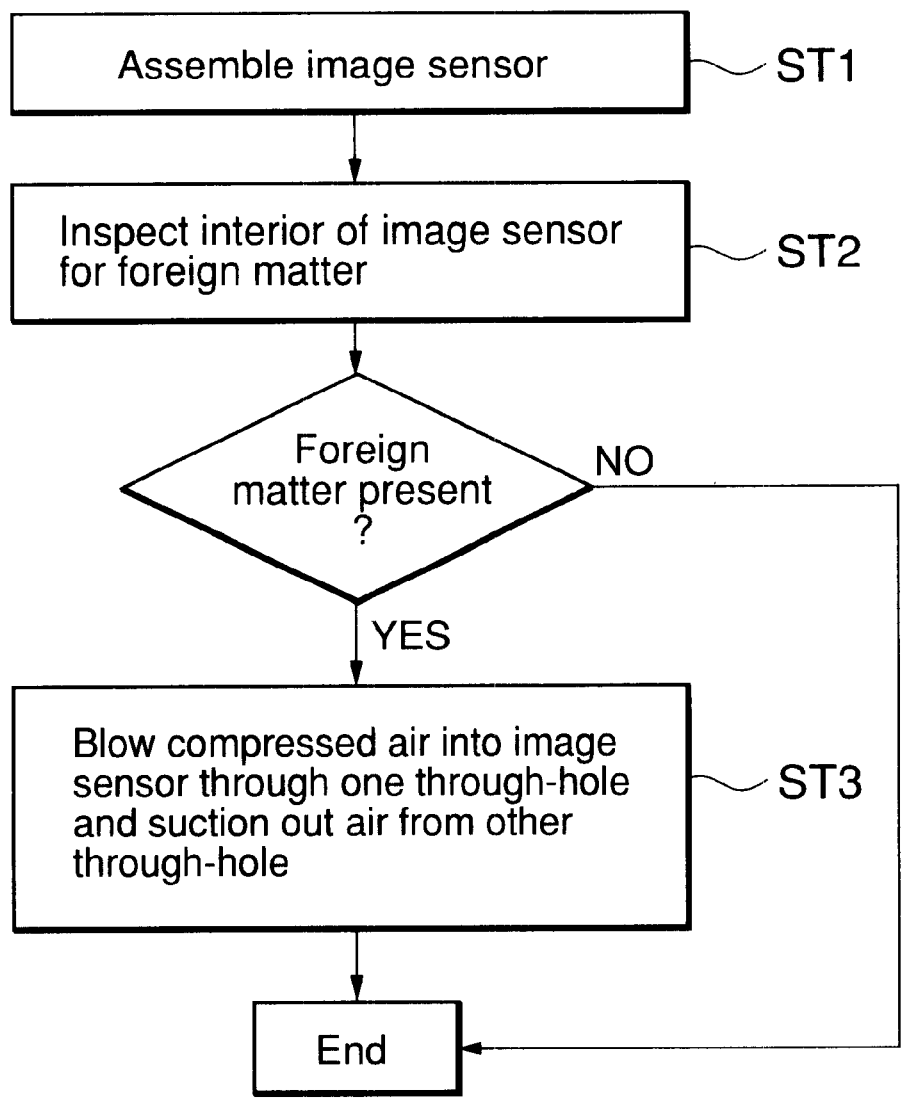
FIG. 18 is a flowchart for explaining the manufacturing method for the image sensor according to the sixth embodiment of the invention.

FIG. 18 shows a flowchart of the manufacturing method for the image sensor of this embodiment. According to the manufacturing method of this embodiment, the image sensor is assembled at step ST1 by disposing components such as the circuit board 2, the light emitting diodes 3, the rod lens array 4, the sensor ICs 5, and the glass plate 6 shown in the foregoing embodiments in the body of image sensor 7.

After assembling the image sensor, at step ST2 an inspection process is carried out to determine whether there is any foreign substance in the interior of the image sensor. In the inspection process, if a foreign substance is found inside the image sensor 7 and the image sensor is thus determined to have a defect, at step ST3 the first nozzle 16 is inserted into a through-hole at one of the end surfaces 7a to blow compressed air into the image sensor through the through-hole, and the second nozzle 17 is inserted into a through-hole at the opposite end surface 7a to suction the air out via the through-hole so as to remove the foreign substance by making use of the air flow, thus obviating the need of disassembling the image sensor.

Alternatively, the process for removing foreign substances in the image sensor as described above may be added to all standard manufacturing processes for image sensors to markedly reduce the occurrence rate of failures. In this case, the inspection step ST2 for checking whether there is a foreign substance inside the frame 7 of an image sensor can be omitted after the image sensor has been assembled; the manufacturing method will always include the step ST3.

While two nozzles 16 and 17 are employed in this embodiment, an air flow can be generated in the image sensor by using only a single nozzle, and the same advantage will be obtained. In such case, air will be forced out through the second through-hole by the action of the compressed air stream.

Figure 16:
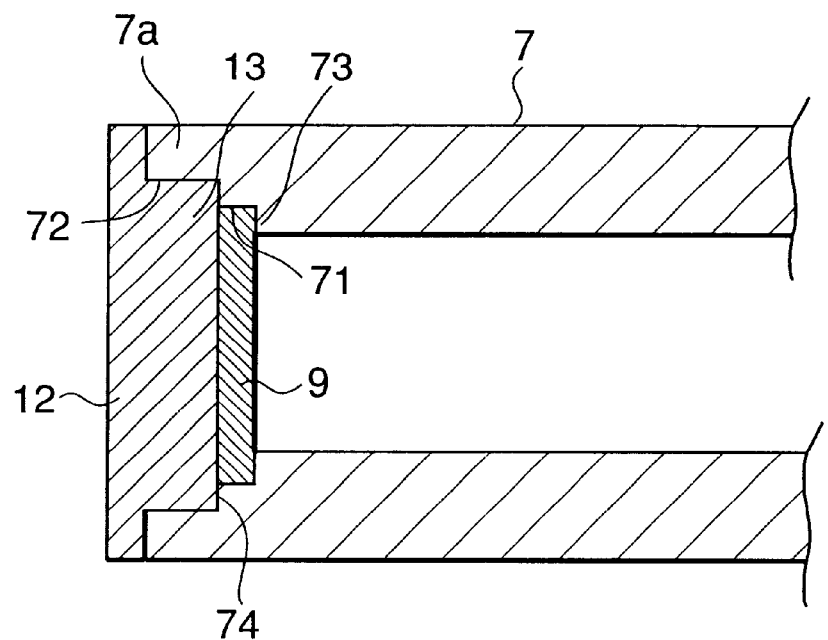
FIG. 16 is a sectional diagram illustrating an installed image sensor and metal mounting fixture 12 according to a seventh embodiment of the invention.

The seventh embodiment as shown in FIG. 16 is variation of the third and fourth embodiments, with emphasis on the state in which the mounting fixture 12 and the image sensor 7 are fixed to each other. The securing method for the mounting fixture 12 and the mounting base 18 is not particularly different from that in the fourth embodiment, and therefore, the description thereof will not be repeated. Reference numeral 9 denotes a cover tape covering the through-hole in the end surface 7a; as described in the foregoing embodiments, the tape is attached to the end surface with an adhesive to cover the through-hole. The tape 9 is made of a material which can expand or contract in the thickness direction thereof; and it is preferable that the adhesive is a detachable and reusable type material.

Reference numeral 13 denotes a projection also closing the through-hole in the end surface 7a; the projection 13 is provided on the mounting fixture 12. Reference numeral 73 denotes the adhesive surface between the tape 9 and the end surface 7a, and reference numeral 74 denotes the contact surface between the projection 13 and the end surface 7a. The end surface 7a is provided with two stepped portions 71 and 72. The height of the stepped portion 71 is set to be smaller than the thickness of the tape 9, while the height of the stepped portion 72 is set to be either at the same level as the height of the projection 13 or larger than the height of the projection 13.

Since the height of the stepped portion 71 is smaller than the thickness of the tape 9, the tape 9 is compressed when the projection 13 is fitted into the through-hole. The tape 9 is made of a material which can expand or contract in the thickness direction thereof, and hence when the projection 13 is pushed into the through-hole, the thickness of the tape 9 becomes equal to the width of the stepped portion 71. In this state, the tape 9 is subjected to a pushing force by the projection 13 to enhance the adhesion of the adhesive surface 73 of the tape 9 to the end surface 7a.

Thus, in this embodiment, in addition to the advantages shown in the fourth embodiment, the provision of the tape 9 and the projection 13 prevent foreign matter from entering the interior of the image sensor 7, and the improved adhesion of the adhesive surface 73 between the tape 9 and the end surface 7a further reduces the chances of foreign matter infiltration. Moreover, the provision of two steps 71 and 72 on end surface 7a further reduces the chances of foreign matter entering the interior of the image sensor 7. In this embodiment, while the height of the stepped portion 71 is set to be smaller than the thickness of the tape 9; it also may be set at the same level as the thickness of the tape 9 or larger than the thickness of the tape 9.

Figure 17:
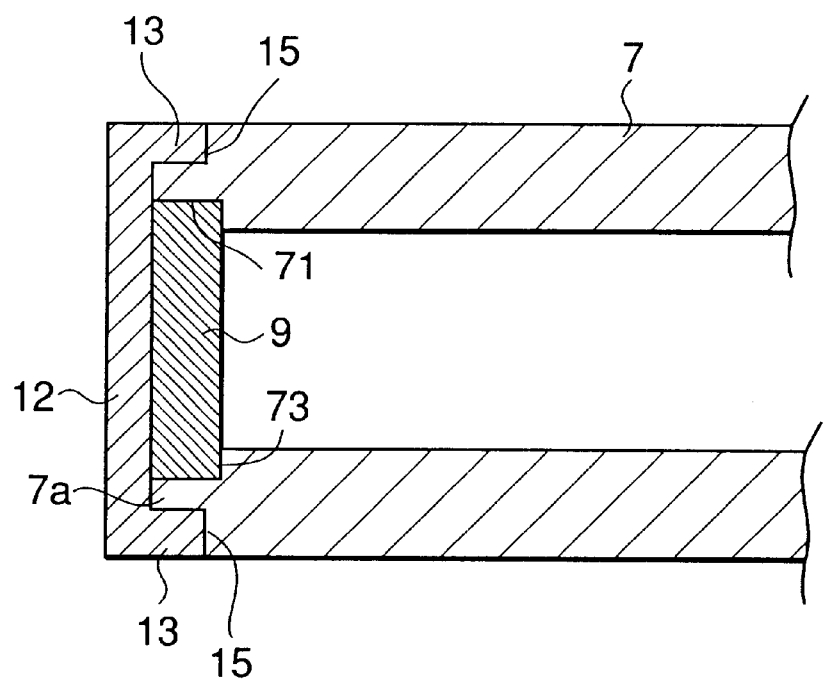
FIG. 17 is a sectional diagram illustrating an installed image sensor and metal mounting fixture 12 according to an eighth embodiment of the invention.

The eighth embodiment as shown in FIG. 17 is a variation of the fifth embodiment with emphasis on the state wherein the mounting fixture 12 and the frame 7 are fixed with respect to each other. The securing method for the mounting metal fixture 12 and the mounting base 18 is not particularly different from that in the fifth embodiment, and therefore, the description thereof will be omitted.

FIG. 17 shows the mounting fixture 12 fixed to the image sensor 7. Like elements of previous figures are given like reference numerals. In this embodiment, projection 13 on mounting fixture 12 fills in notches 15 provided in each side of the end surface 7a.

In this embodiment, in addition to the advantages shown in the fifth embodiment, the improved adhesion of the adhesive surface 73 between the tape 9 and the frame end surface 7a further reduces the chances of foreign matter entering the image sensor 7. Moreover, the stepped portion 71 further reduces the chances of foreign matter entering the interior of the image sensor. As in FIG. 16, the width of the stepped portion 71 be set to be the same or larger than the thickness of the tape 9, instead of being smaller than the thickness of the tape 9.

The invention having been described, it will be apparent to those skilled in the art that the same may be varied in many ways without departing from the spirit and scope of the invention. Any and all such modifications are intended to be included within the scope of the following claims.

What is claimed is:

1. An image sensor, comprising:
   a light source for irradiating light onto a document;
   a light sensor for detecting light reflected by said document and converting said light into an electric signal;
   a circuit board for receiving said electric signal;
   a housing which encloses said light source, said light sensor, and said circuit board, and having a plurality of wall surfaces which surround said light source, light sensor and circuit board, wherein a through-hole is provided in at least one of said plurality of wall surfaces to provide access to an interior of said housing for removal of foreign substances from the interior of said housing, which may have entered into said housing, without requiring disassembly of said housing; and
   a cover member detachably attached to said at least one wall surface provided with said through-hole, said cover member covering said through-hole when attached to said at least one wall surface during normal operation of said image sensor.

2. An image sensor according to claim 1, wherein said at least one wall surface has a contact portion and a remaining portion, said cover member making contact with said contact portion, and said contact portion being recessed with respect to said remaining portion thereby forming a step therebetween.

3. An image sensor according to claim 2, wherein said cover member has a thickness smaller than a width of said step.

4. An image sensor according to claim 1, wherein said cover member is comprised of an adhesive tape.

5. A document reading apparatus, comprising:
   an image sensor having
      a light source for irradiating light onto a document;
      a light sensor for detecting light reflected by said document and converting said light into an electric signal;
      a circuit board for receiving said electric signal;
      a housing which encloses said light source, said light sensor, and said circuit board, and having a plurality of wall surfaces which surround said light source, light sensor and circuit board, wherein a through-hole is provided in at least one of said plurality of wall surfaces to provide access to an interior of said housing for removal of foreign substances from the interior of said housing, which may have entered into said housing, without requiring disassembly of said housing;
   a rest on which said image sensor is mounted; and
   a fixing member for securing said image sensor to said rest, said fixing member being provided with a projection which fits into said through-hole during normal operation of said document reading apparatus.

6. A document reading apparatus according to claim 5, further comprising a cover member detachably attached to said at least one wall surface provided with said through-hole, said cover member covering said through-hole when attached to said at least one wall surface, wherein fitting said projection into said through-hole causes said projection to push said cover member against said at least one wall surface.

7. A document reading apparatus according to claim 6, wherein said cover member comprises an adhesive tape.

8. A document reading apparatus comprising:
   an image sensor having
      a light source for irradiating light onto a document;
      a light sensor for detecting light reflected by said document and converting said light into an electric signal;
      a circuit board for receiving said electric signal;
      a housing which encloses said light source, said light sensor, and said circuit board, and having a plurality of wall surfaces which surround said light source, light sensor and circuit board, wherein a recessed portion is provided in at least one of said plurality of wall surfaces to provide access to an interior of said housing for removal of foreign substances from the interior of said housing, which may have entered into said housing, without requiring disassembly of said housing;
   a rest on which said image sensor is mounted; and
   a fixing member for securing said image sensor to said rest, said fixing member being provided with a projection which fits in said recessed portion.

9. A document reading apparatus according to claim 8, wherein said recessed portion comprises a through-hole providing access to the interior of said housing.

10. A document reading apparatus according to claim 9, further comprising a cover member detachably attached to said at least one wall surface provided with said through-hole, said cover member covering said through-hole when attached to said at least one wall surface, wherein fitting said projection into said through-hole causes said projection to push said closing member against said at least one wall surface.

11. A document reading apparatus according to claim 10, wherein said cover member comprises an adhesive tape.

* * * * *